United States Patent [19]

Walker et al.

[11] Patent Number: 4,641,231

[45] Date of Patent: Feb. 3, 1987

[54] APPARATUS AND METHOD FOR FAILURE TESTING OF A CONTROL TURN-OFF SEMICONDUCTOR

[75] Inventors: Loren H. Walker, Salem; Georges R. E. Lezan, Roanoke, both of Va.

[73] Assignee: General Electric Company, Salem, Va.

[21] Appl. No.: 805,646

[22] Filed: Dec. 6, 1985

[51] Int. Cl.<sup>4</sup> .......................................... H02H 7/122
[52] U.S. Cl. ....................................... 363/58; 363/96; 363/137; 307/252 C; 361/88
[58] Field of Search ...................... 363/55–58, 363/96, 135–138; 307/252 C, 252 K, 252 L, 252 M; 361/79, 86–88, 91, 93, 100

[56] References Cited

U.S. PATENT DOCUMENTS

| | | | |
|---|---|---|---|
| 4,231,083 | 10/1980 | Matsuda et al. | 363/57 X |
| 4,384,248 | 5/1983 | Matsuda et al. | 363/58 X |
| 4,593,204 | 6/1986 | McMurray | 307/252 C |
| 4,597,038 | 6/1986 | Stacey | 307/252 C |

FOREIGN PATENT DOCUMENTS

| | | | |
|---|---|---|---|
| 0022386 | 2/1982 | Japan | 363/58 |
| 0099264 | 6/1983 | Japan | 363/58 |

OTHER PUBLICATIONS

M. Hashii et al., "New Approach to a High Power GTO PWM Inverter for AC Motor Drive", IEEE—IAS—1985 Conference Record, Toronto, Canada, Oct. 6–11, 1985, pp. 467–472.

M. Peppel et al., "Application of Gate Turn—Off Thyristors (GTO)—Concepts and Problems Today", First European Conference on Power Electronics and Applications, Brussels, Belgium, Oct. 16–18, 1985, pp. 1.61–1.66.

Primary Examiner—Peter S. Wong
Attorney, Agent, or Firm—Arnold E. Renner

[57] ABSTRACT

A scheme for determining the operational state of a control turn-off semiconductor, of the type having an anode, a cathode and control electrode to which signals are applied to control the conductive state of the semiconductor, utilizes the extant voltage at the control electrode to determine the actual conductive state of the semiconductor. A first signal representing the desired operational state of the semiconductor and a second signal representing the actual operation of the state of the semiconductor and appropriately combined in one embodiment to generate an indication of the operational state of the control turn-off semiconductor. A further embodiment, employed in a series connection of two such control turn-off semiconductors beteen dc buses, uses the second signals in a cross-coupled arrangement between the two semiconductors to inhibit the application of control signals to a first semiconductor if the second semiconductor is conductive.

In a still further embodiment, the cross-coupled system just described is further combined with an anode sensing system to provide an improved, more positive system of preventing the dc short by providing the anode system sensing output system as a further input to the combination of the cross-coupled second signal and signal representing desired conduction.

In an additional modification a latch function serves, in the cross-coupled embodiments, to render the cross-coupling inhibiting ineffective, once a semiconductor has been rendered conductive, for the commanded period of conduction.

24 Claims, 7 Drawing Figures

APPARATUS AND METHOD FOR FAILURE TESTING OF A CONTROL TURN-OFF SEMICONDUCTOR

CROSS REFERENCE TO RELATED APPLICATION

The present invention is related to co-pending application Ser. No. 805,645, titled "In-Circuit Testing of Control Turn-Off Semiconductors" which was filed on even date herewith and which is assigned to the assignee of the present invention.

BACKGROUND OF THE INVENTION

The present invention relates to apparatus and method for determining the conductive state of a control turn-off semiconductor and to such method and apparatus as applied to an electric power converter employing series connected control turn-off semiconductors between direct current (dc) buses to prevent the rendering a one of the semiconductors in the series connection conductive before the other has become non-conductive.

There are a number of situations in which the conductive state of a semiconductor device is required to be known. It may, for example, be required to know the state of conduction for alarm or total shutdown purposes of a system. More commonly, in many power converters, there are included two semiconductors connected in a series arrangement in what is commonly referred to as a "leg" between the buses of a dc source. These semiconductors serve to control the electric power supplied to a load. A common converter of this type is a three-phase converter having three legs connected in mutual parallel between positive and negative dc buses. The semiconductors of the legs are rendered conductive in a predetermined order or sequence in order to control the electrical power delivered from the dc buses to the load. If both semiconductors of any one leg become simultaneously conductive, it is apparent that there will exist between the two dc buses a short circuit which, if allowed to continue may have disastrous results to the load, the power source and/or to the semiconductors themselves. If the semiconductor devices are of the type which require signals to a control electrode in order to render the device selectively conductive and non-conductive, the problem becomes more acute since devices of this nature, as presently known, are very limited in the amount of current which they can interrupt or turn-off. Devices of this nature common in today's discipline are referred to as gate turn-off thyristors and power transistors. Collectively, such devices are referred to in this application as "control turn-off semiconductors".

There are several methods and apparatus for determining the conductive capabilities of a control turn-off semiconductor. For example, the recently invented scheme described in the aforementioned patent application Ser. No. 805,645, which is cross referenced to this application, employs current transformers and determines the general operational capability of the control turn-off semiconductor prior to application of full power to the device. This scheme is not, however, well suited to the detection of the conductive state of the device during full operation.

One method of attempting to avoid the earlier referenced dc short circuit between the buses is to simply provide a delay between the gate pulses turning one of the devices of a leg off and the gate pulses turning the other device on. So long as the delay is longer than the time it takes to turn the semiconductor off, a short is usually prevented. This system has the disadvantage in that it is not positive in its action; i.e., there is no positive indication that the first device has actually turned off. Additionally, it is not well adapted to high performance systems since the delay must be sufficient to permit the first semiconductor to turn off under all operating circumstances.

Another system is what is referred to as the anode sensing method. This system monitors current direction and the semiconductor anode to cathode voltage. If the current polarity is positive, then the turn-off of that semiconductor will be indicated by the appearance of a positive voltage from the anode to cathode. Thus, by delaying the gating of the second semiconductor of the leg until the voltage appears across the first, a short circuit of the dc source can be prevented. This system, however, does not work if the current is negative; that is, being carried by the diode which is normally connected in antiparallel in these types of systems. In this case, because the diode is conducting, the voltage sensed will stay very small. If the second control turnoff device is gated on before the first is actually turned off, or when the first has failed in a shorted mode then a short circuit will exist.

SUMMARY OF THE INVENTION

It is, therefore, an object of the present invention to provide improved method and apparatus for failure testing of a control turn-off semiconductor.

It is another object to provide for the sensing of an improper operating state of a control turn-off semiconductor through sensing the voltage at the control electrode of the semiconductor.

It is a further object to provide method and apparatus for preventing a short circuit between dc buses of a power converter of the type having series connected control turn-off semiconductors.

It is an additional object to provide method and apparatus for preventing a short circuit, between the dc buses of a power converter of the type having series connected control turn-off semiconductors, through sensing of the voltage of the control electrode to thereby develop inhibit signals to prevent the inappropriate firing in time of the semiconductors of a given leg.

The foregoing and other objects are achieved in accordance with the present invention, by determining the operational state of a control turn-off semiconductor of the type having anode, cathode and control electrodes. Appropriate signals are applied to the control electrode to govern the conductive state thereof and the extant voltage at that electrode is used to determine to actual conductive state. The present invention also utilizes a first signal representing the desired operational state of the semiconductor in conjunction with a second signal representing the actual operation of the state of the semiconductor. The second signal is that developed as a function of the extant voltage at its control electrode. The first and second signals developed are appropriately combined to generate a fault indication when the second signal indicates a conductive state of the semiconductor and the first signal indicates a desired nonconductive state. In an embodiment of the invention employed in a series connection of two such control turn-off semiconductors forming a leg between a pair of dc buses, the second signal representing the extant state of a one of the semiconductors in a leg is combined (cross-coupled) with the desired control signal of the first semiconductor to inhibit the rendering of that first semiconductor conductive when the second semiconductor is still in its conductive state.

In a still further embodiment of the present invention, the cross-coupled system just described is further combined with an anode sensing system to provide a further improved, more positive system of preventing the dc short. This embodiment provides the anode system sensing output signal as a further input to the combination of the cross-coupled second signal and signal representing desired conduction.

In an additional refinement applicable to either of the cross-coupled emodiments, a latch (e.g. flip-flop) circuit is used to maintain a semiconductor in its conducting state for its intended conduction period to prevent spurious turn-off operation.

BRIEF DESCRIPTION OF THE DRAWING

While the present invention is defined in particularity in the claims annexed to and forming a part of this specification, a better understanding thereof can be had by reference to the following description taken in conjunction with the accompanying drawing in which:

DETAILED DESCRIPTION

Figure 1:
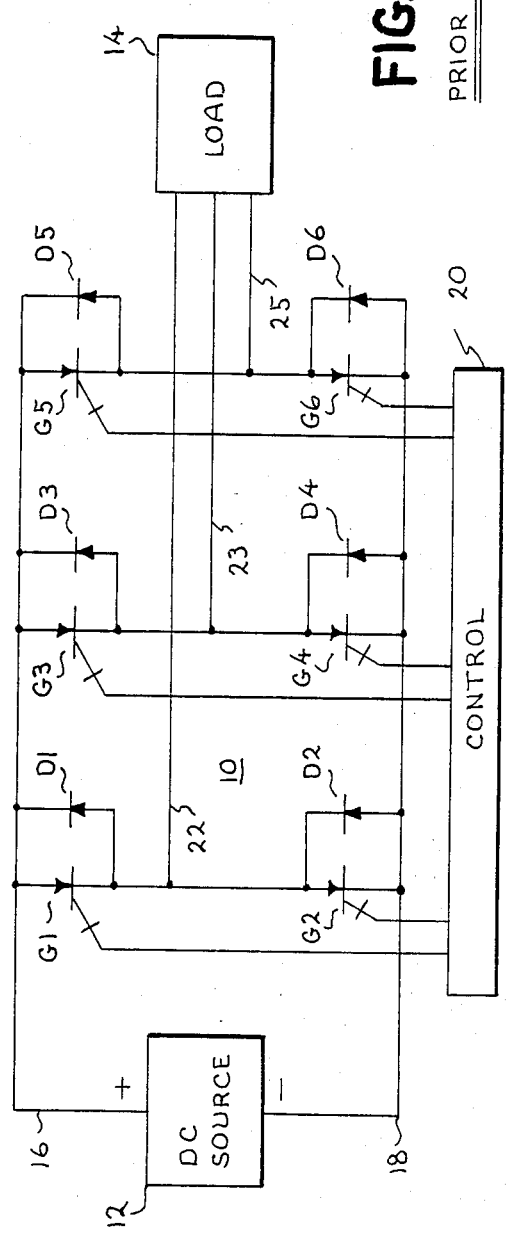
FIG. 1 is a high level schematic diagram of a typical three-phase power converter for supplying power to a load, useful as a typical background and environment for understanding the present invention.

Referencing first FIG. 1, there is shown a typical three-phase voltage source inverter for supplying power to a load from a dc source. Such an inverter provides a suitable environment for the present invention although it is not limited thereto. This invention is applicable to current source converters as well although the utilization of the fault signal could be different. As shown, the converter 10 is comprised of three legs including control turn-off semiconductor devices G1 through G6 having corresponding antiparallel connected diodes D1 through D6. A first leg is defined by the series connection of semiconductors G1 and G2 with their respective diodes D1 and D2. Semiconductors G3 and G4 with their respective diodes form the second leg while semiconductors G5 and G6 with diodes D5 and D6 form the third leg. A source of dc power, indicated generally at 12 and which may be, for example, a full wave rectification bridge connected to an alternating current (ac) source, is connected by way of positive bus 16 and negative bus 18 to the converter 10. A load 14 which may be of any suitable type, for example an alternating current motor, is connected to the output of converter 10 by leads 22, 23 and 25. Each of the control turn-off semiconductors includes an anode, a cathode and a control electrode in accordance with standard depiction. As is customary in the art, under the action of a suitable control 20, the various control turn-off semiconductors G1 through G6 are rendered conductive and nonconductive at appropriate times by the application of suitable signals to the control electrodes to thereby control the power which is supplied from the source 12 to the load 14.

From the depiction in FIG. 1, it is seen that if both control turn-off semiconductors of a single leg (e.g., G1 and G2) are on at any one time, a short circuit will exist between the buses 16 and 18 which can result in damage to the semiconductors, the power supply and/or load.

Figure 2:
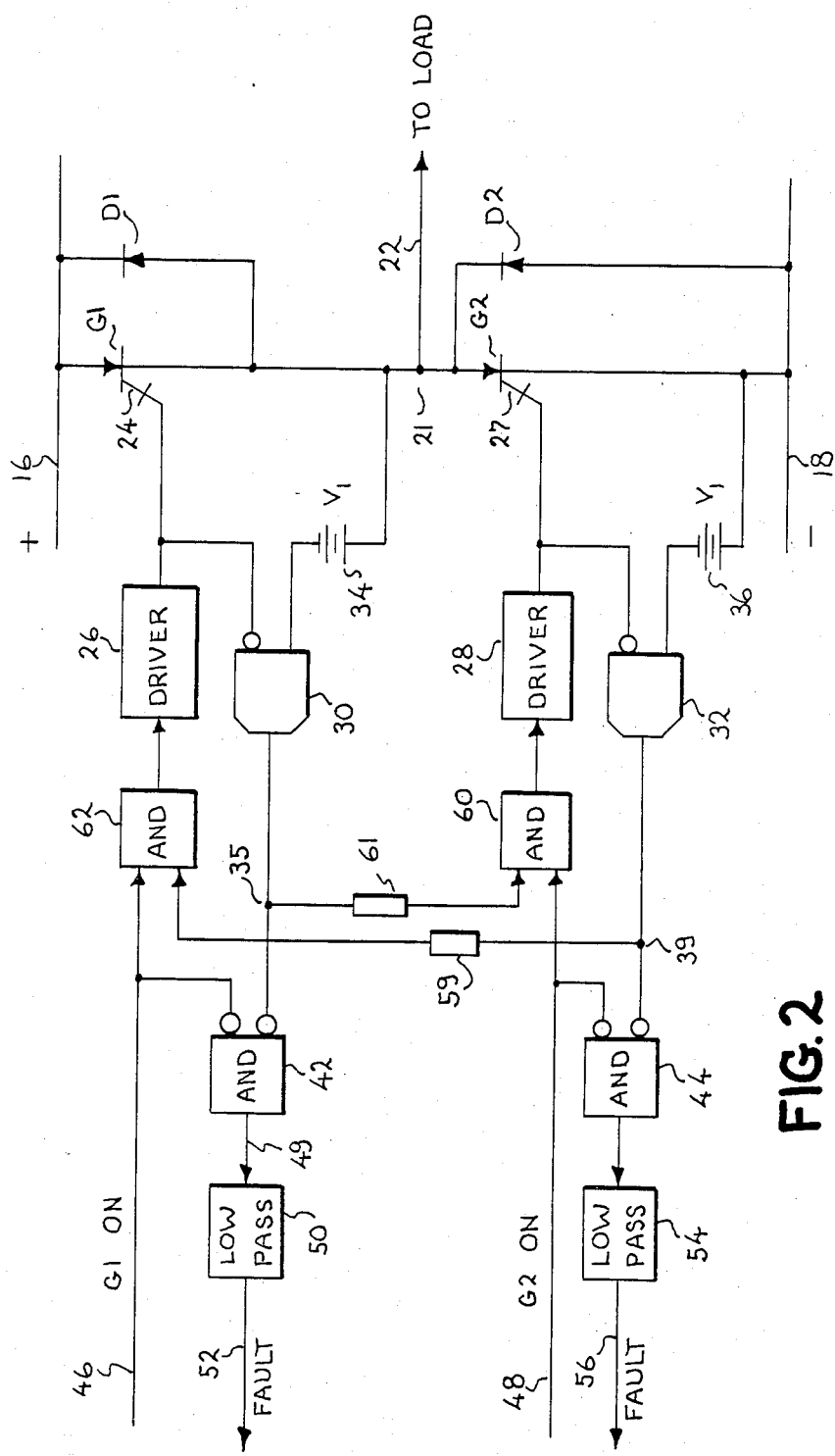
FIG. 2 is a schematic diagram illustrating the present invention in its preferred and basic form and further illustrating the present invention as applied to a power converter to prevent a short circuit across the dc buses of a converter.

Reference is now made to FIG. 2 which illustrates the apparatus and method of the present invention both in its basic form to determine the operational state of a control turn-off semiconductor and the use of that basic invention to prevent the simultaneous conduction of two semiconductors connected in series across a bus, such as described earlier with respect to FIG. 1. FIG. 2 shows buses 16 and 18 between which devices G1 and G2 are connected in series. Diodes D1 and D2 are included in their customary antiparallel relationships.

In the ensuing discussion, binary connotations of "1" and "0" will be used. This is a form of convenience in discussing the logic and not an indication that only digital implementations are contemplated. The equivalency of digital and analog logic is well recognized.

The anode of semiconductor G1 is connected to bus 16 and the cathode is connected to a node 21 from which emanates line 22, connected to the load. Node 21 is also connected to anode of semiconductor G2 the cathode of which is connected to the negative bus 18. The gate or control electrodes of the two semiconductors G1 and G2, electrodes 24 and 26, are connected respectively to the inverting inputs of a pair of comparators 30 and 32. Comparator 30 has a non-inverting input connected to node 21 by way of a suitable voltage reference 34 such that there will appear at the output of the comparator 30 (node 35) a binary 1 signal when the gate electrode 24 is sufficiently negative to indicate that control turn-off semiconductor G1 is in its non-conductive state. In a similar manner, comparator 32 has its inverting input connected to control electrode 26 of device G2 and its non-inverting input connected to a suitable negative voltage reference 36. The output of comparator 32, at node 39, will be a binary 1 when the gate 27 of device G2 is sufficiently negative to indicate that it is not conductive.

The output of comparator 30 at node 35 is first applied to an inverting input of an AND gate 42 which has a second inverting input connected to line 46. The signal on line 46 (G1 ON) would emanate from suitable control means, (e.g., control 20 in FIG. 1) and would normally be a pulse continuing for the length of time that the control desired or commands the semiconductor G1 to be in the conducting state. AND gate 42 will thus have as its output on line 49 a signal which is a binary 1 only during those periods when there is a binary 0 at node 35 indicating that device G1 is conducting and the absence of a signal on line 46. This situation exists when device G1 is conducting when it should not be.

The signal on line 49 is applied to a low pass filter (which may be of analog or digital form) the output of which on line 52 will be a fault signal indicating that the device G1 is conducting at a time when it should not be. This signal may be used for any desired purpose such as activating a visual or audio alarm or it may, if desired, be employed for remedial action such as to remove input power from the semiconductor devices. It is noted that the sole function of the low pass filter 50 is to remove spurious or transient signals of a positive nature which may occur as, for example, during switching operations, to prevent nuisance indications.

In a similar manner, the output of comparator 32, at node 39, is applied to an inverting input of an AND gate 44 having as its second input the signals on line 48 indicating a desired conduction mode of device G2. The output of AND gate 44 is applied to a low pass filter 54 the output of which is a fault signal on line 56 representing a conduction of device G2 at a time when it is supposed to be non-conducting. Thus, it is seen there is provided a relatively simple way of providing an indication of improper conduction of devices G1 and G2.

The aspect of the invention related to the preventing of the simultaneous conduction of the two control turn-off semiconductors within the leg of a system such as the bridge of FIG. 1 also employs the outputs of the two comparators 30 and 32 and the signals on lines 46 and 48 but in a cross coupling arrangement. In accordance with the convention here being used, binary 1 signals on lines 46 and 48 designate, respectively, a desired conducting state for the respective semiconductor devices. It will also be remembered that the output of each of the comparators 30 and 32 is a binary 1 when the respective control turn-off semiconductor is nonconductive and a binary 0 when it is conductive. As seen in FIG. 2, the signal at node 35 is applied as one input to an AND gate 60 (by way, if required, of a suitable isolation circuit 61) the other input of which is the signal on line 48. Thus, it is seen that when comparator 30 provides an output signal which is a binary 1, indicating that device G1 is not conductive, gate 60 is free to pass the signals on 48 to a suitable gate driving circuit 28 which provides a signal of suitable magnitude to the control electrode 26 of semiconductor device G2, thus permitting that device to be turned on. If, however, the output of comparator 30 is a binary 0, indicating that semiconductor G1 is conducting, the signal applied therefrom to AND gate 60 will be of an inhibiting nature preventing the passing of the signals on line 48. Thus the driver circuit 28 will not be permitted to provide enabling signals to the device G2.

Node 59 at the output of comparator 32 is cross coupled and applied via an isolation circuit 59 (again, if required) to one input of an AND gate 62. The other input of gate 62 is the gating signals for semiconductor G1 on line 46. The output of AND gate 62 is applied to a driver circuit 26 the output of which, as was described earlier, is the signal enabling the conduction of device G1. If device G2 is conducting the binary 0 signal from comparator 32 will inhibit gate 62 and the passing of the signals on line 46. Thus, the rendering conductive of device G1 will be prevented. It is seen that by this cross coupling arrangement, rendering a one of the two control turn-off semiconductors in the leg between the two buses 16 and 18 conductive will be inhibited so long as the other semiconductor is in a conducting state.

Figure 3:
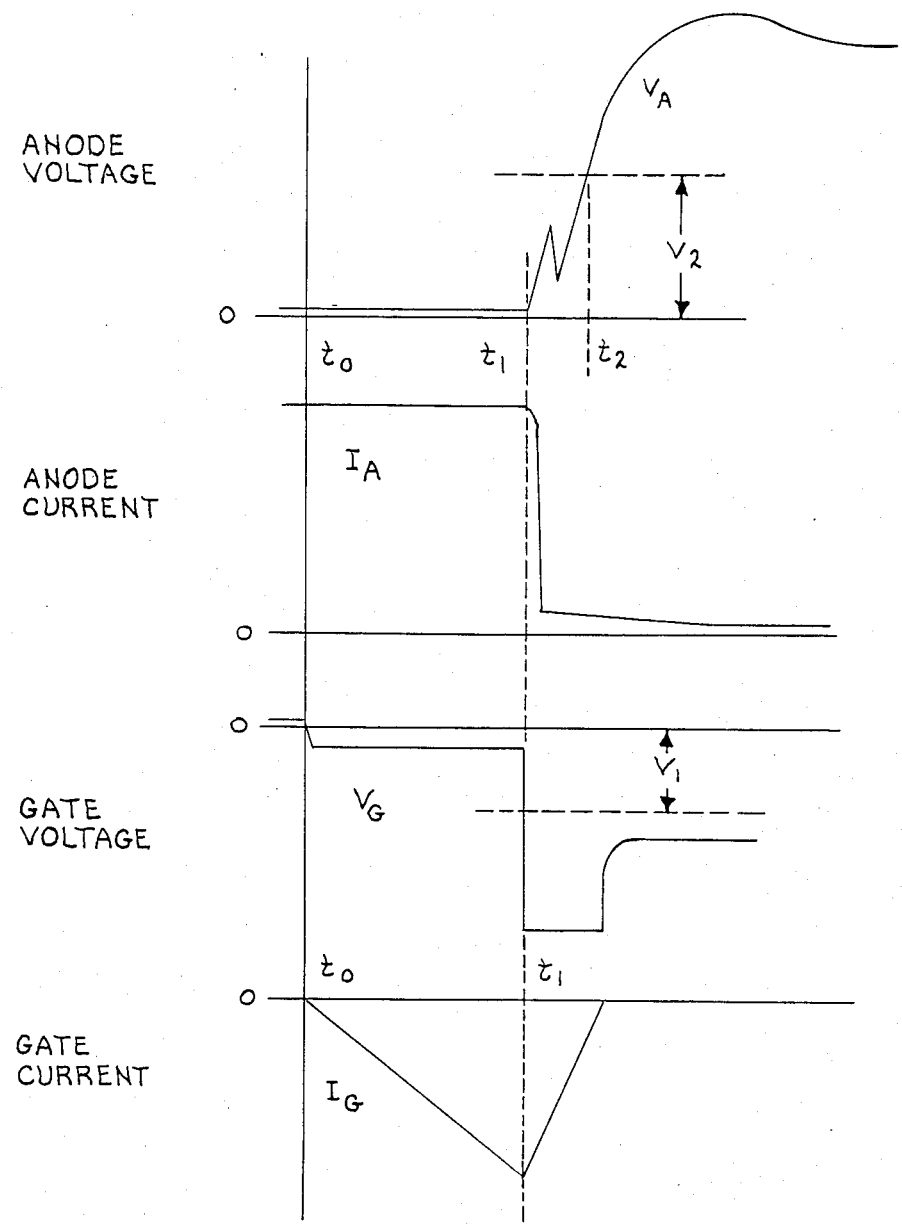
FIGS. 3, 4 and 5 are waveforms helpful in understanding the present invention.

FIG. 3 shows, in its several traces, typical operational waveforms applicable to a gate turn-off (GTO) thyristor used as the control turn-off semiconductor in the circuit of FIG. 2. The waveforms of FIG. 3 are to the same time base, are taken with the cathode as a reference, and show the time of a turn-off with forward current, that is, current from anode to cathode of a device.

Turn-off of the device is initiated at time $t_0$ by the beginning of the rise of negative gate (control electrode) current $I_G$. (See bottom trace in FIG. 3.). There is no change in the anode voltage or current until time $t_1$ when $I_G$ reaches a value sufficient to initiate voltage blocking in the control turn-off semiconductor. At time $t_1$, anode current $I_A$ begins to fall and the anode voltage $V_A$ begins to rise. Gate voltage rises to the gate-cathode junction avalanche voltage at time $t_1$ when reverse gate current can no longer be drawn from the junction. The time of blocking, $t_1$, can be determined by sensing this rise of voltage on the gate. Time $t_1$ is the time that the control voltage $V_G$ exceeds the reference voltage $V_1$.

Figure 4:
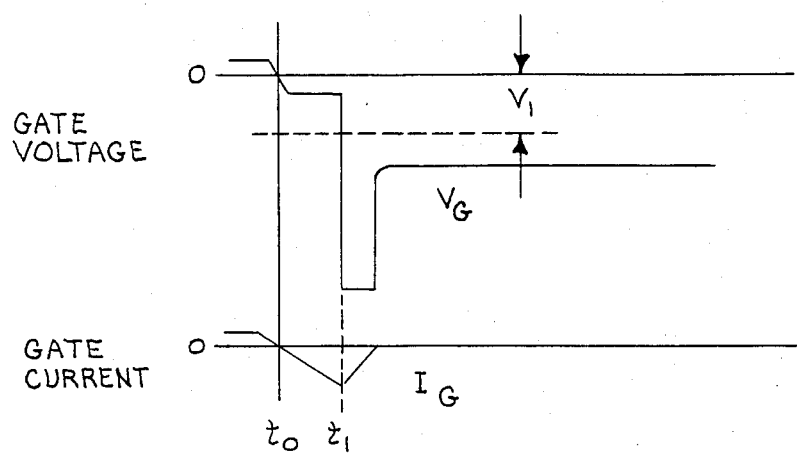
Figure 5:
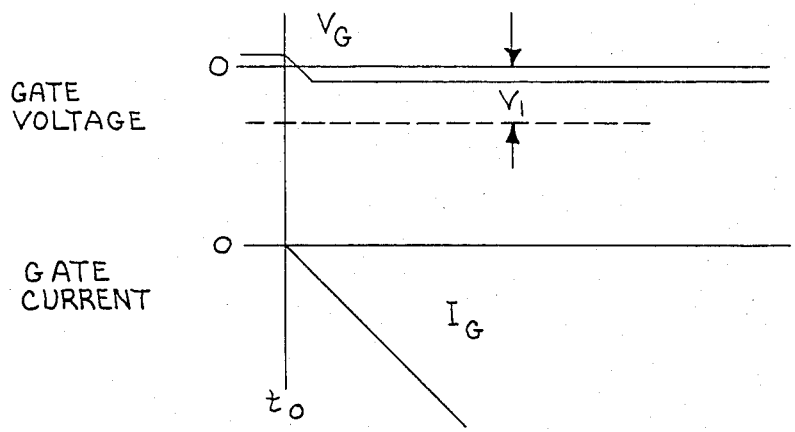

If the current in the leg is negative, that is, in the diode rather than in the control turn-off semiconductor, the anode voltage will never rise due to a turn-off pulse to the GTO. Thus, only the gate sensing method herein disclosed of FIG. 3 is effective. The waveforms in this case are shown in FIG. 4. The anode voltage and current are not shown because they are not affected by the turn-off signal. The gate current in this case can flow in reverse direction for only a brief time ($t_0$ to $t_1$) because it has only to sweep out the carriers resulting from the immediately previous "on current" to the gate. The gate to cathode voltage $V_G$ steps to larger than $V_1$ at time $t_1$ to indicate that the GTO is in the blocking state even though there is no anode voltage to prove it. This is a major advantage of the method of the present invention. By waiting a brief time after $t_1$, the control can apply a turn-on pulse to the other series control turn-off semiconductor with confidence that the first has been given a turn-off pulse which will block voltage when the antiparallel diode recovers. As earlier indicated, the waveforms of FIGS. 3–5 are for a GTO. Waveforms for bi-polar transistors would be very similar while other types of devices would be characterized by somewhat similar waveforms.

FIG. 5 shows the case when the control turn-off semiconductor being turned off has failed (has lost its ability to block forward voltage) or has failed for some reason to turn off. In this case, gate voltage is always small, never exceeding $V_1$, such that the control is inhibited from turning on the other series connected semiconductor device. It can be shown that a failed gate turn-off thyristor which is shorted anode to cathode will always be shorted anode to gate. The effect of the disclosed invention in the case of a total failure of the device to turn off is that the inverter stops producing output, but there is no fault on the dc bus, and thus there is no damaging current requiring the more drastic action such as blowing of circuit breakers or fuses. In a case of a failure of a control turn-off device to turn-off temporarily (for example due to over temperature), the device may be saved from permanent damage by the present invention which prevents a damaging current level from following the failure. The inverter may be, therefore, restarted after a short cooling down period without having to replace fuses or other parts.

The advantages of a further modification of the present invention will be described with respect to FIG. 6. In the FIG. 2 embodiment, if the sensing of turn-off had been by the anode sensing method, as was previously described in the background of the invention, and if the threshhold voltage of the sensor were set at value $V_2$ (top trace in FIG. 3), then the time of blocking would have been sensed at time $t_2$. This represents a potentially better time for sensing that turn-off has occurred. It is better to turn on the other control turn-off semiconductor as the voltage across it approaches zero. The time of this zero voltage is better represented by time $t_2$ rather than time $t_1$. If time $t_1$ only were used, a fixed delay would be desired in the gating of the other control turn-off semiconductor. By utilizing time $t_2$, the delay may be eliminated and gating of the other device may proceed as soon as possible. Thus, the embodiment of FIG. 6 employs both methods, that is, the control electrode sensing method described with respect to FIG. 3 in combination with the anode sensing method to provide the best turn time for the other device.

Figure 6:
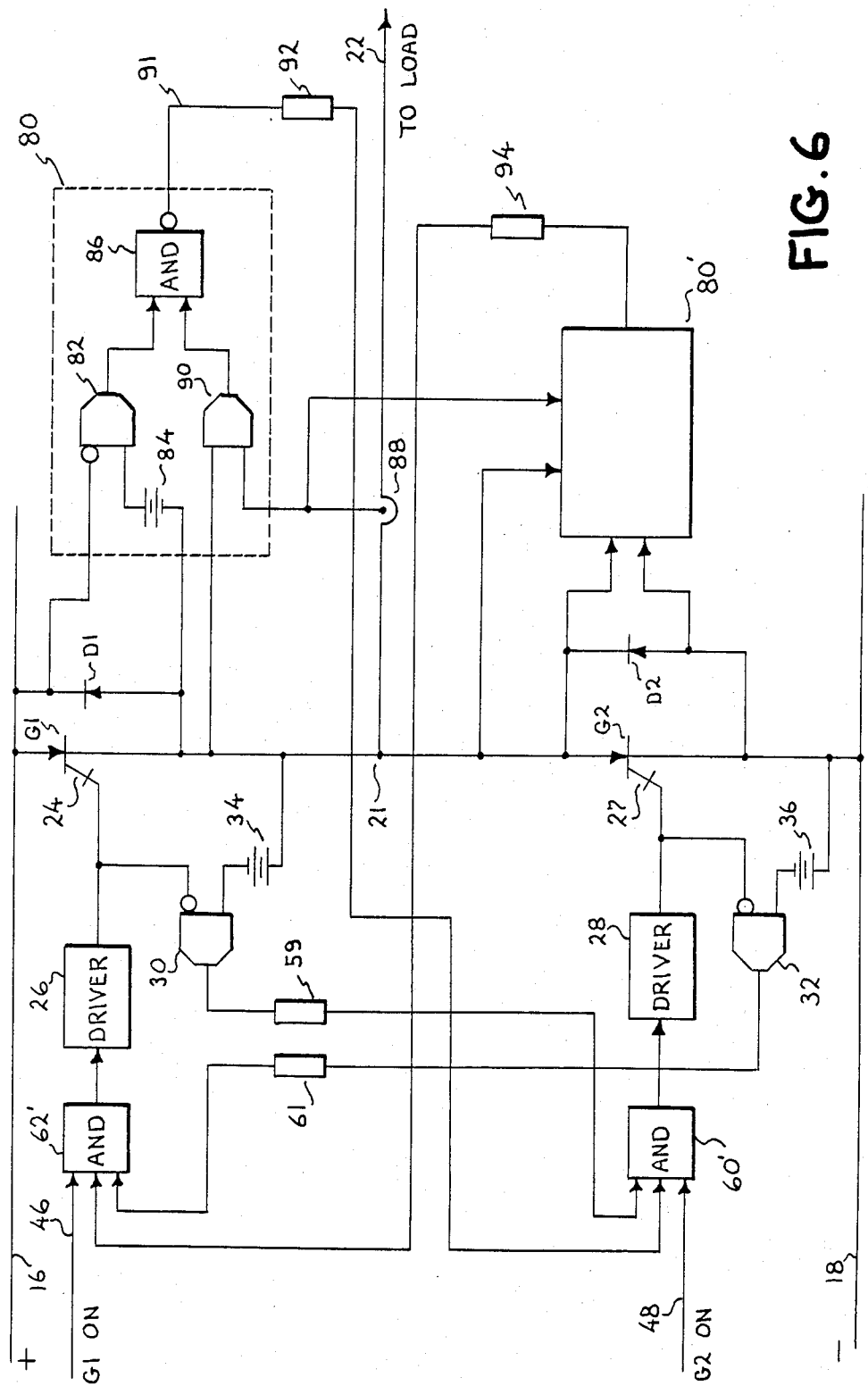
FIG. 6 is a schematic diagram illustrating a further embodiment of the present invention.

Referencing FIG. 6, it is seen that that portion of the drawing to the left of the devices G1 and G2 (and diodes D1 and D2) is the same as described with respect to FIG. 2 with two exceptions. First of all, AND gates 42 and 44, low pass filters 50 and 54 and output lines 52 and 56 have been omitted since they play no part in this portion of the invention. In addition, the two input AND gates 60 and 62 have been replaced, respectively, by three input AND gates 60' and 62' to accommodate additional enabling/inhibit signals to these gates from the rest of the depiction as shown in FIG. 6.

Looking now to the upper portion of FIG. 6, it is seen within the dashed line block 80 there is provided a first comparator 82 which has its inverting input connected to the anode of device G1. A second (noninverting) input is connected by way of a suitable voltage reference 84 to the cathode of device G1. Thus, comparator 82 will provide a binary 1 signal only when the anode voltage is below a predetermined value, for example, that shown at $V_2$ in the upper trace of FIG. 3. As a current sensing function, a second comparator 90 is provided with an input representing the voltage at node 21 and a second input from a suitable current sensing device such as a current transformer 88. Thus, comparator 90 provides a binary 1 output when current is flowing in line 22 in the direction towards load. The two comparators 82 and 90 provide inputs to an AND gate 86 which, because of the inverted output, will provide a binary 0 on line 91 when the anode voltage is below the prescribe value ($V_2$) and the current is in the forward direction. AND gate 86 provides a binary 1 at all other times. This output is applied (via an isolating circuit 92 if desired) in a cross coupled manner as the third input of the AND gate 60'. Thus AND gate 60' will be disabled when the current is positive and the anode voltage is below $V_2$ (FIG. 3). In a similar manner, although not shown in detail, a block 80' provides an output signal via an isolating circuit 94 to a third input of AND gate 62'. The only difference in this situation would be that the comparator within block 80' which receives the signal from the current transformer 88 would be applied by way of inverting input indicating that current in line 22 is in the opposite direction, that is, flowing from the load and through diode D1.

Figure 7:
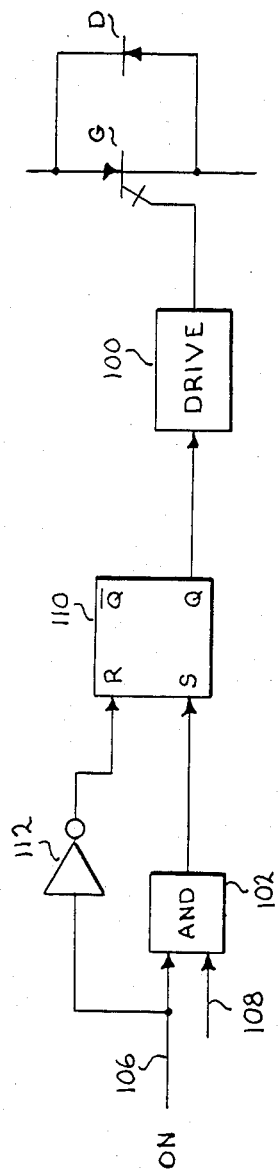
FIG. 7 is a schematic diagram of a possible modification to the embodiments of FIGS. 2 and 6.

FIG. 7 shows a modification which may be made to either of the embodiments of FIG. 2 or FIG. 6. In FIG. 7, control turn-off semiconductor G and diode D represent any of the similarly designed devices of the earlier figures. In a like manner, drive 100 represents either of the drives 26 and 28 of the earlier showings and AND gate 102 represents any of the AND gates 60 and 62 of FIG. 2 and 60' and 62' of FIG. 6. AND gate 102 receives an "ON" signal via line 106 as in the previous instances and lead 108 represents the application of the additional enabling/inhibit signal or signals.

The difference between the earlier embodiments and the present is the inclusion of a latch circuit or flip-flop 110 which is interposed between the AND gate and the drive. In this embodiment a logic 1 signal from AND gate 102 will place flip-flop 110 in its set state to enable drive 100 until the flip-flop is reset. Resetting flip-flop 110 is achieved by the application of an appropriate signal to its R input via inverter 112 connected to line 106. Thus flip-flop 110 will reset when the signal on line 106 calls for non-conduction of device G.

The latching feature is desirable if the control turn-off semiconductors are not capable of turning off instantaneously when commanded to do so. It is also very beneficial to have in the situation in which a control turn-off semiconductor fails while it is in the non-conducting or blocking state. In this latter case, failure will result in the immediate establishment of a short circuit which the control turn-off semiconductor may be incapable of correcting. By way of example using the FIG. 2 embodiment, assume device G2 is properly conducting and although commanded to be in the off condition, device G1 fails and begins to conduct. In this situation, comparator 30 would immediately provide an output signal which would disable AND gate 60 to cause semiconductor G2 to turn-off and interrupt the short circuit. This is a desirable response where the control turn-off semiconductor G2 has a turn-off time sufficiently short with respect to the rise time of the fault current so that this current can be interrupted before it exceeds the turn-off rating of the good device (G2 in this example). In the case, however, where the device is slow to turn off or the source inductance is small, the good control turn-off semiconductor may be unable to turn off until after the fault current has exceeded its maximum turn-off rating resulting in destruction of the good device.

The interposed flip-flop 110 of FIG. 7 prevents the above from occurring. The cross-coupled signals can inhibit the turning on of a semiconductor but cannot cause an interruption of the "on" signal to a conducting device once it is conducting. In addition to the above, it will be recognized that the interposing of the flip-flop in the manner indicated will reduce erratic turn-off action as from spurious signals, etc.

While there have been described what are presently believed to be the preferred embodiments of the present invention, modifications thereto will readily occur to those skilled in the art. It is not desired, therefore, that the present invention be limited to the specific embodiments shown and described and it is intended to encompass within the claims all such modifications that fall within the true spirit and scope of the invention.

What is claimed:

1. A method of determining the conductive state of a control turn-off semiconductor of the type having an anode, a cathode and a control electrode to which signals are applied to control the conducting state of the semiconductor comprising the steps:

(a) generating a control electrode voltage signal representing the extant voltage at said control electrode; and, (b) combining said control electrode signal with a reference voltage signal of predetermined value to develop output signals representing the operational state of said semiconductor.

2. A method in accordance with claim 1 wherein said step of combining includes the step of comparing said control electrode voltage signal with said reference voltage signal to provide a first output signal when said control electrode voltage signal is more negative than said reference voltage signal to indicate a nonconducting state of said semiconductor and a second output signal when said control electrode voltage signal is less negative than said reference voltage signal to indicate a conducting state of said semiconductor.

3. Apparatus to determine the operational state of a control turn-off semiconductor of the type having an anode, a cathode and a control electrode to which signals are applied to control the conductive state of said semiconductor comprising;
 (a) means to generate a control electrode voltage signal representing the extant voltage at said control electrode; and,
 (b) means to combine said control electrode voltage signal with a reference signal having a predetermined value to develop output signals representing the operational state of said semiconductor.

4. The invention in accordance with claim 3 wherein said means to generate said output signals includes a comparator circuit to develop a first output signal when said control electrode voltage signal is more negative than said reference voltage signal, said first output signal indicating a non-conductive state of said semiconductor, and a second output signal when said control electrode voltage signal is less negative than said reference voltage signal, said second output signal indicating a conductive state of said semiconductor.

5. A method of sensing an improper operational state of a control turn-off semiconductor of the type having an anode, a cathode and a control electrode to which signals are applied to control the conducting state of the semiconductor comprising the steps:
 (a) providing a first signal representing a desired operational state of said semiconductor;
 (b) generating a second signal representing the actual operation of the semiconductor as a function of the extant voltage at said control electrode; and,
 (c) combining said first and second signals to provide a fault signal when said second signal indicates a conducting state of said semiconductor and first signal indicates a desired non-conducting state.

6. A method in accordance with claim 5 wherein said second signal is generated as a function of the voltage of said control electrode exceeding a magnitude of a predetermined value.

7. A method in accordance with claim 5 wherein said step of combining includes the steps:
 (a) combining said first and second signals to provide an intermediate signal; and,
 (b) generating said fault signal in response to said intermediate signal existing for a predetermined period of time.

8. Apparatus to sense an improper operational state of a control turn-off semiconductor of the type having an anode, a cathode and a control electrode to which signals are applied to control the conductive state of said semiconductor comprising;
 (a) means to provide a first signal representing a desired operational state of said semiconductor;
 (b) means to generate a second signal representing the actual operational state of the semiconductor as a function of the extant voltage at said control electrode; and,
 (c) means for combining said first and second signals to generate a fault signal when said second signal indicates a conducting state of said semiconductor and said first signal indicates a desired non-conductive state.

9. The invention in accordance with claim 8 wherein said means to generate said second signal includes a comparator circuit to develop said second signal as a function of the voltage at said control electrode exceeding a magnitude of a predetermined value.

10. The invention in accordance with claim 8 wherein said means for combining said first and second signals includes an AND function circuit to provide said intermediate signal and wherein said means for generating said fault signal includes a low pass filter.

11. For use in a power converter of the type having first and second series connected control turn-off semiconductors, each having an anode, a cathode and a control electrode, included in a leg between a pair of direct current buses, a method of preventing the rendering conductive of a one of the semiconductors while the other semiconductor is conductive comprising the steps:
 (a) selectively providing signals to the control electrodes of said semiconductors operable to render said semiconductors conductive;
 (b) developing inhibit signals respectively indicative of respective conductive states of associated semiconductors as functions of extant voltages at the control electrodes of said semiconductors; and,
 (c) inhibiting the application of a control signal to a one of said semiconductors in response to an inhibit signal associated with the other said semiconductors indicating that the said other semiconductor is conductive.

12. The invention in accordance with claim 11 wherein said inhibit signals are generated in response to the voltage at the control electrode of the associated semiconductor exceeding a predetermined value.

13. A method in accordance with claim 12 further including the steps of:
 (a) providing respective voltage signals when the anode to cathode voltages of associated semiconductors exceed a predetermined value;
 (b) generating a current signal when current through said semiconductors is in a prescribed direction;
 (c) logically combining said voltage and current signals to generate enable signals associated with respective semiconductors; and,
 (d) further inhibiting the application of a control signal to a one of said semiconductors in response to the absence of an enable signal associated with the other of said semiconductors.

14. A method in accordance with claim 11 further including the steps of:
 (a) providing respective voltage signals when the anode to cathode voltages of associated semiconductors exceed a predetermined value;
 (b) generating a current signal when current through said semiconductors is in a prescribed direction;
 (c) logically combining said voltage and current signals to generate enable signals associated with respective semiconductors; and,
 (d) further inhibiting the application of a control signal to a one of said semiconductors in response to the absence of an enable signal associated with the other of said semiconductors.

15. A method in accordance with claim 13 further including the step of rendering the steps of inhibiting ineffective, once an associated one of said semiconductors has become conductive, for a period of commanded conduction.

16. A method in accordance with claim 11 further including the step of rendering said inhibiting step ineffective, once a one of said semiconductors has become conductive, for a period of commanded conduction. semiconductors.

17. Apparatus to prevent a short circuit between dc buses of a power conversion system of the type having first and second series connected control turn-off semiconductors, each having anode, cathode and control electrodes, connected between the buses for controlling electrical power to be delivered to a load comprising:
   (a) first and second means to selectively provide control signals, respectively, to said first and second semiconductors operable to render said semiconductors conductive;
   (b) first and second means associated with said first and second semiconductors to generate first and second inhibit signals representing that the voltages at the respective control electrodes are of a value representing a conducting state of the semiconductor;
   (c) first inhibit means responsive to said second inhibit signal to prevent the application of control signals to the control electrode of said first semiconductor; and,
   (d) second inhibit means responsive to said first inhibit signal to prevent the application of control signals to the control electrode of said second semiconductor.

18. The invention in accordance with claim 17 wherein said voltage value representing a conducting state of a semiconductor is a value less than a predetermined value.

19. The invention in accordance with claim 18 further including, with respect to each of said first and second semiconductors;
   (a) means to sense the anode to cathode voltage of the respective semiconductor and provide a voltage signal when said voltage is in excess of predetermined value;
   (b) means to determine whether current through said semiconductors is in a prescribed direction and to generate a current signal in response thereto;
   (c) means to logically combine the voltage and current signals to provide enable signals; and,
   (d) means to cross couple said enable signals associated with said first and second semiconductors to the second and first inhibit means respectively whereby said inhibit means are further inhibited in the absence of said respective enable signals.

20. The invention in accordance with claim 17 wherein each of said means to generate said inhibit signals comprises a comparator circuit having as a first input a signal representative of the voltage at the associated control electrode and as a second input a signal representing a predetermined voltage value.

21. The invention in accordance with claim 17 wherein said first inhibit means comprises an AND function circuit having as a first input said second inhibit signal and as a second input a signal representing a desired conduction state of said first semiconductor and wherein said second inhibit means comprises an AND function circuit having as a first input said first inhibit signal and as a second input a signal representing a desired conduction state of said second semiconductor.

22. The invention in accordance with claim 17 further including, with respect to each of said first and second semiconductors;
   (a) means to sense the anode to cathode voltage of the respective semiconductor and provide a voltage signal when said voltage is in excess of predetermined value;
   (b) means to determine whether current through said semiconductors is in a prescribed direction and to generate a current signal in response thereto;
   (c) means to logically combine the voltage and current signals to provide enable signals; and,
   (d) means to cross couple said enable signals associated with said first and second semiconductors to the second and first inhibit means respectively whereby said inhibit means are further inhibited in the absence of said respective enable signals.

23. The invention in accordance with claim 22 further including first and second latch means operable, respectively, to supersede the action of said first and second inhibit means to thereby maintain the providing of respective control signals to said semiconductors for a period of commanded conduction.

24. The invention in accordance with claim 17 further including first and second latch means operable, respectively, to supersede the action of said first and second inhibit means to thereby maintain the providing of respective control signals to said semiconductor for a period of commanded conduction.

* * * * *